US011919757B2

(12) United States Patent
Gordon

(10) Patent No.: US 11,919,757 B2
(45) Date of Patent: Mar. 5, 2024

(54) SCISSOR JACK

(71) Applicant: Derek John Gordon, Alberton (ZA)

(72) Inventor: Derek John Gordon, Alberton (ZA)

( * ) Notice: Subject to any disclaimer, the term of this patent is extended or adjusted under 35 U.S.C. 154(b) by 365 days.

(21) Appl. No.: 17/054,871

(22) PCT Filed: Jul. 5, 2019

(86) PCT No.: PCT/ZA2019/000005
§ 371 (c)(1),
(2) Date: Nov. 12, 2020

(87) PCT Pub. No.: WO2020/028924
PCT Pub. Date: Feb. 6, 2020

(65) Prior Publication Data

US 2021/0214198 A1 Jul. 15, 2021

(30) Foreign Application Priority Data

Aug. 1, 2018 (ZA) ................................ 2018/05169

(51) Int. Cl.
*B66F 3/12* (2006.01)
*B66F 3/22* (2006.01)

(52) U.S. Cl.
CPC . *B66F 3/12* (2013.01); *B66F 3/22* (2013.01)

(58) Field of Classification Search
CPC ........................................................ B66F 3/12
(Continued)

(56) References Cited

U.S. PATENT DOCUMENTS 1,526,767 A * 2/1925 Benjamins ................ B66F 3/12
254/126
4,492,014 A * 1/1985 Alexander ............ B25B 27/023
29/259
(Continued)

FOREIGN PATENT DOCUMENTS

CN 111115488 A * 5/2020
FR 691204 A * 10/1930
KR 20110113075 A * 10/2011

OTHER PUBLICATIONS

Gorthech (Multi stage scissor jack animation) found at: https://www.youtube.com/watch?v=EyKO0fiPiMY&t=13s (Year: 2020).*
(Continued)

*Primary Examiner* — Mahdi H Nejad
(74) *Attorney, Agent, or Firm* — AU LLC; Adam E. Urbanczyk

(57) ABSTRACT

The present invention discloses a scissor jack comprising four arms hingedly arranged to provide two opposite elbows between a base and a load support. A pair of trunnions are provided with an outer trunnion at one outer elbow and a threaded trunnion at another outer elbow opposite to the one outer elbow connected through a threaded shaft. The inner third trunnion is connected to two rods to form a yoke. The yoke is configured to slideably pass through the outer trunnion of the one outer elbow to extend beyond the one outer elbow. A pair of levers are provided which are configured to be secured to the inner third trunnion. The scissor jack further comprises springs or any other retaining mechanism attached to a pair of levers, to ensure that the pair of levers return to their original location or position when the scissor jack is lowered.

4 Claims, 3 Drawing Sheets

(58) Field of Classification Search
USPC .......................................... 254/126, 122, 124
See application file for complete search history.

(56) References Cited

U.S. PATENT DOCUMENTS

| | | | | | |
|---|---|---|---|---|---|
| 4,930,751 | A * | 6/1990 | Hutchins | B25B 27/304 | 29/227 |
| 5,262,706 | A * | 11/1993 | Hollingsworth | B66F 5/025 | 318/560 |
| 8,052,121 | B2 * | 11/2011 | Christie | B66F 3/12 | 254/122 |
| 8,365,875 | B2 * | 2/2013 | Garceau | B60T 3/00 | 254/122 |
| 2010/0065795 | A1 * | 3/2010 | Christie | B66F 3/12 | 254/126 |
| 2014/0374680 | A1 * | 12/2014 | Tsang | B62B 3/0612 | 254/7 C |

OTHER PUBLICATIONS

Gorthech (Lifting a Toyota Land Cruiser with the new multi stage scissor jack (Pat. Pending)) Published on Dec. 30, 2019 found at https://www.youtube.com/watch?v=44YXAVZnAQc (Year: 2019).*

* cited by examiner

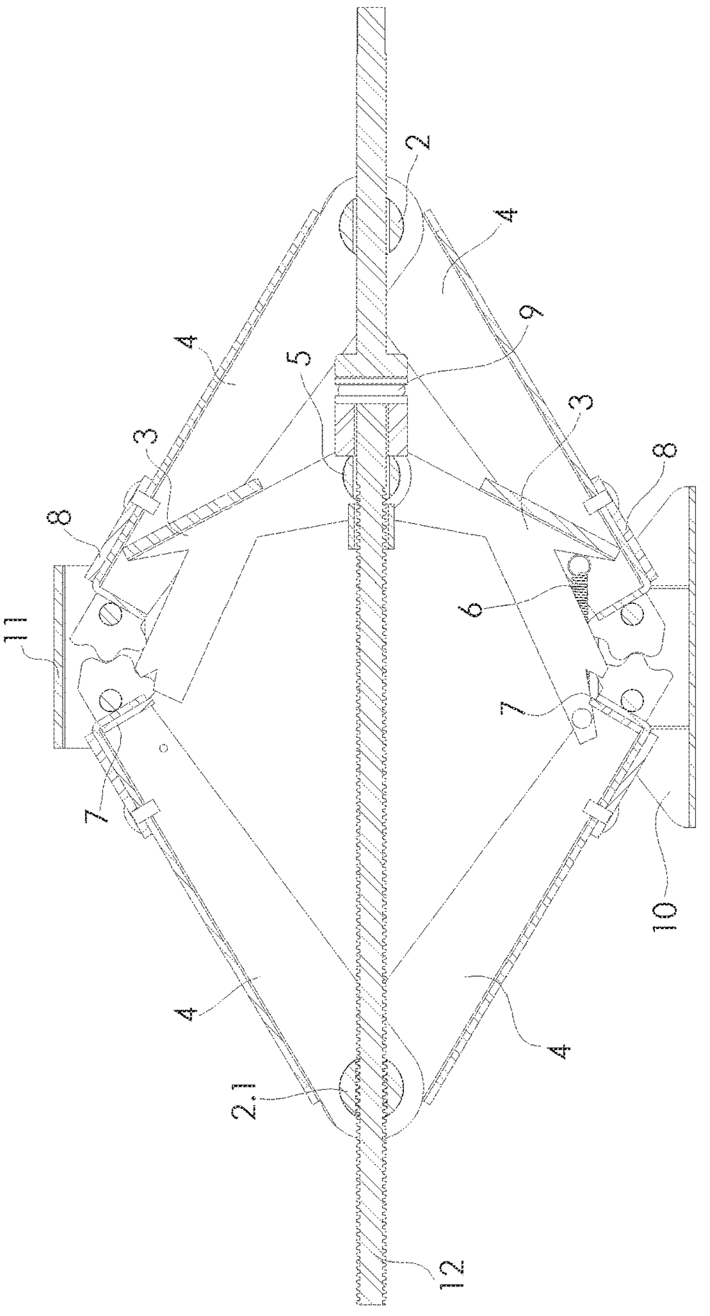
FIG. 1
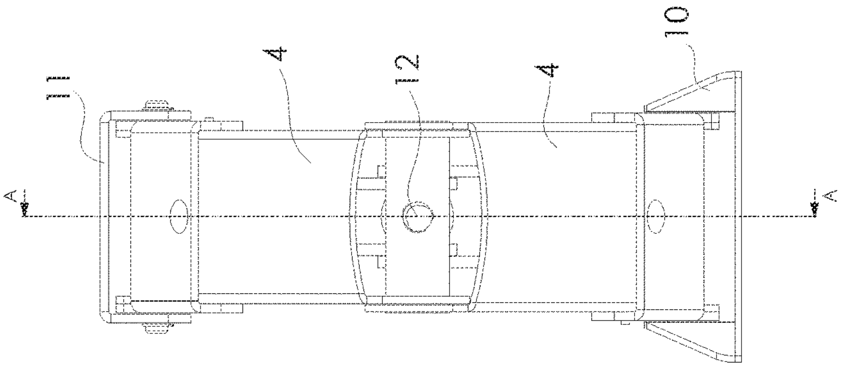

SCISSOR JACK

TECHNICAL FIELD

The present invention relates generally to the field of jacking systems, and more particularly to a scissor jack configured to be used for the lifting of light motor vehicles.

CROSS REFERENCE TO RELATED APPLICATIONS

The present application claims a filing date of an earlier South African Utility Model application having application number ZA2018/05169 with 8 Jan. 2018 as its priority date, which was submitted to the Companies and Intellectual Property Commission (CIPC). All contents or relevant subject matter of the priority application is hereby incorporated entirely or wherever appropriate by reference.

BACKGROUND ART

The need has long existed for an improved jack for light motor vehicles that collapses sufficiently low enough for low slung or low ground clearance vehicles and yet has a lifting stroke greater than the suspension travel of Sport Utility Vehicles. The focus here is on the scissor jack because of it's simplicity.

Scissor jacks typically have a very limited lifting range and are only operable within the last 25% of their stroke. Fully collapsed they have no useful lifting capacity and if used at less than 75% of their full height are prone to breaking. Ideally a jack should be stable and robust. Further, it should have the ability to utilize its full range of motion. The invention is primarily aimed at, but not limited to the automotive industry. The invention disclosed satisfies these needs to a remarkable degree.

BRIEF SUMMARY OF THE INVENTION

In accordance with an embodiment hereof, the present disclosure provides a scissor jack configured for lifting of light motor vehicles. The scissor jack comprises a double yoke, a pair of trunnions, a pair of levers, four arms, a third trunnion, springs, a thrust bearing, a threaded shaft, and a load support. The pair of trunnions are outer trunnions at the elbows and configured to be connected through the threaded shaft. The four arms are hingedly connected to provide two opposite elbows between the base and the load support. The threaded shaft further comprises an unthreaded section held in place by a flange and the thrust bearing. The unthreaded section is a part of the assembly of the pair of levers which pivot about the third trunnion between the pair of trunnions. The springs or any other retaining mechanisms are attached to the pair of levers, which ensures that the pair of levers return to their original position or location when the scissor jack is lowered.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF DRAWINGS

In the figures, similar components and/or features may have the same reference label. Further, various components of the same type may be distinguished by following the reference label with a second label that distinguishes among the similar components. If only the first reference label is used in the specification, the description applies to any one of the similar components having the same first reference label irrespective of the second reference label.

FIG. 1 illustrates a full view of a scissor jack, in accordance with one embodiment of present disclosure;

DISCLOSURE OF THE INVENTION

Figure 2:
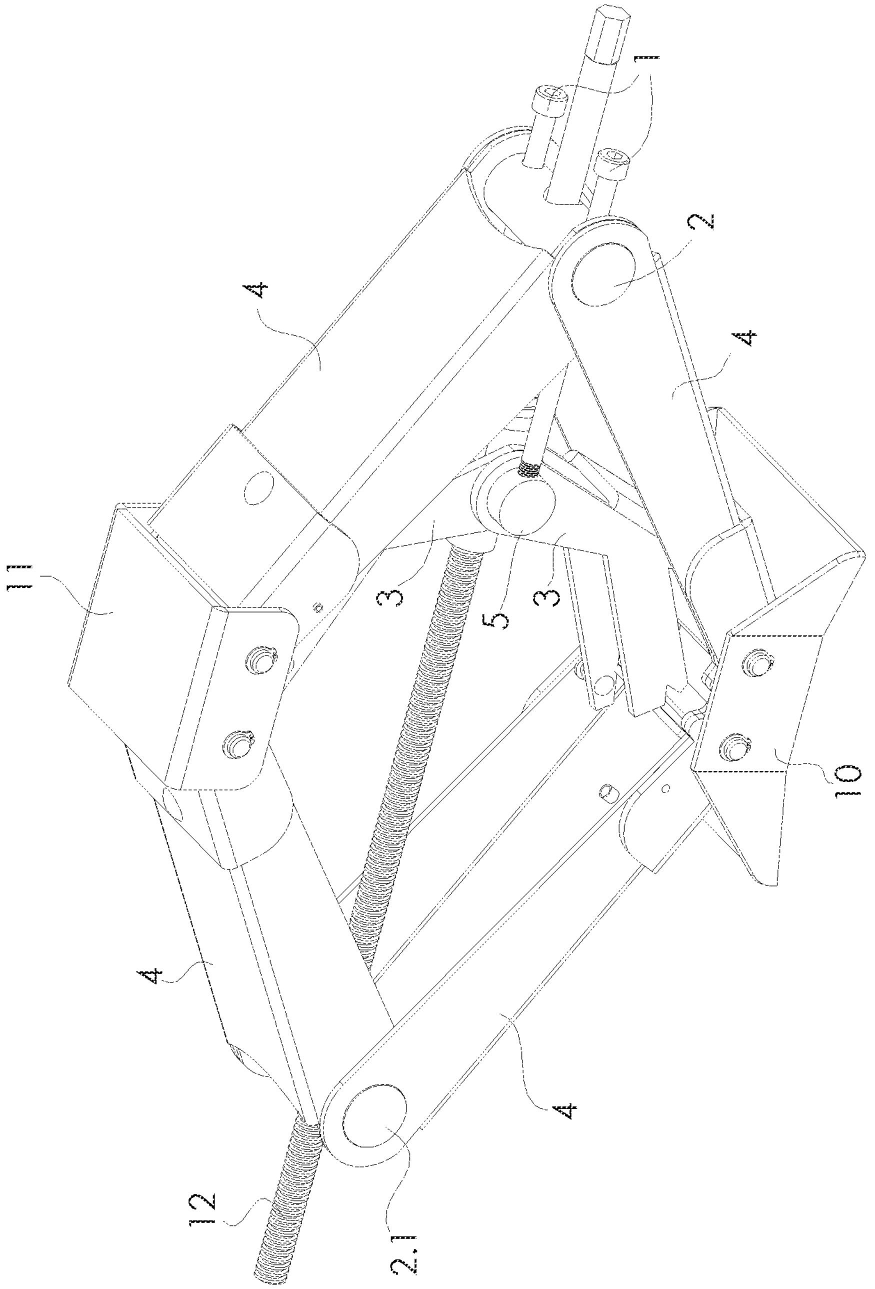
FIG. 2 illustrates a full view of the scissor jack, in accordance with another embodiment of the present disclosure.

In general, a pantograph type lifting apparatus commonly known as a scissor jack to raise vehicles is described. A typical embodiment of the scissor jack comprises of a pair of trunnions 2, 2.1, a threaded trunnion 2.1, four arms 4, a base 10, and a load support 11. The four arms 4 are configured to be hingedly arranged to provide two opposite elbows between the base 10 and the load support 11. The pair of trunnions 2, 2.1 with both trunnions at each elbow are configured to be connected by a threaded shaft 12 with the threaded end. The pair of trunnions 2, 2.1 are further configured to be rotatably engaged in the threaded trunnion 2.1 to extend beyond the outer corner of the elbow. The threaded shaft 12 further includes an unthreaded section configured to be held in place by a flange and a thrust bearing 9. The threaded shaft 12 is part of the assembly of a pair of levers 3 which pivot about an inner third trunnion 5 between the outer two trunnions, and is secured by a yoke 1 of two rods passing slidably through the outer trunnion 2 at an opposite elbow.

Referring to the images wherein like reference numerate designate corresponding parts throughout the several images, reference is made first to FIG. 1 and FIG. 2 that illustrates the full view of an embodiment of the scissor jack. The scissor jack comprises the thrust bearing 9 configured to be located in a fixed position on the unthreaded section of the threaded shaft 12, and is in contact with the yoke 1. The pair of levers 3 is configured to be pivotally secured on the inner third trunnion 5. The inner third trunnion 5 or inner trunnion is connected to two rods to form the yoke. The two rods of the yoke 1 are configured to be slideably pass through the outer trunnion 2 to extend beyond the outer elbow.

In one embodiment, the two rods are the rods or bolts with nuts to prevent withdrawal from the inner third trunnion 5 from the outer elbow.

In another embodiment, the two rods are configured to be terminated in a manner that the two rods are able to withstand forces of jacking, in order to prevent the withdrawal of the two rods from the outer trunnion 2.

Figure 3:
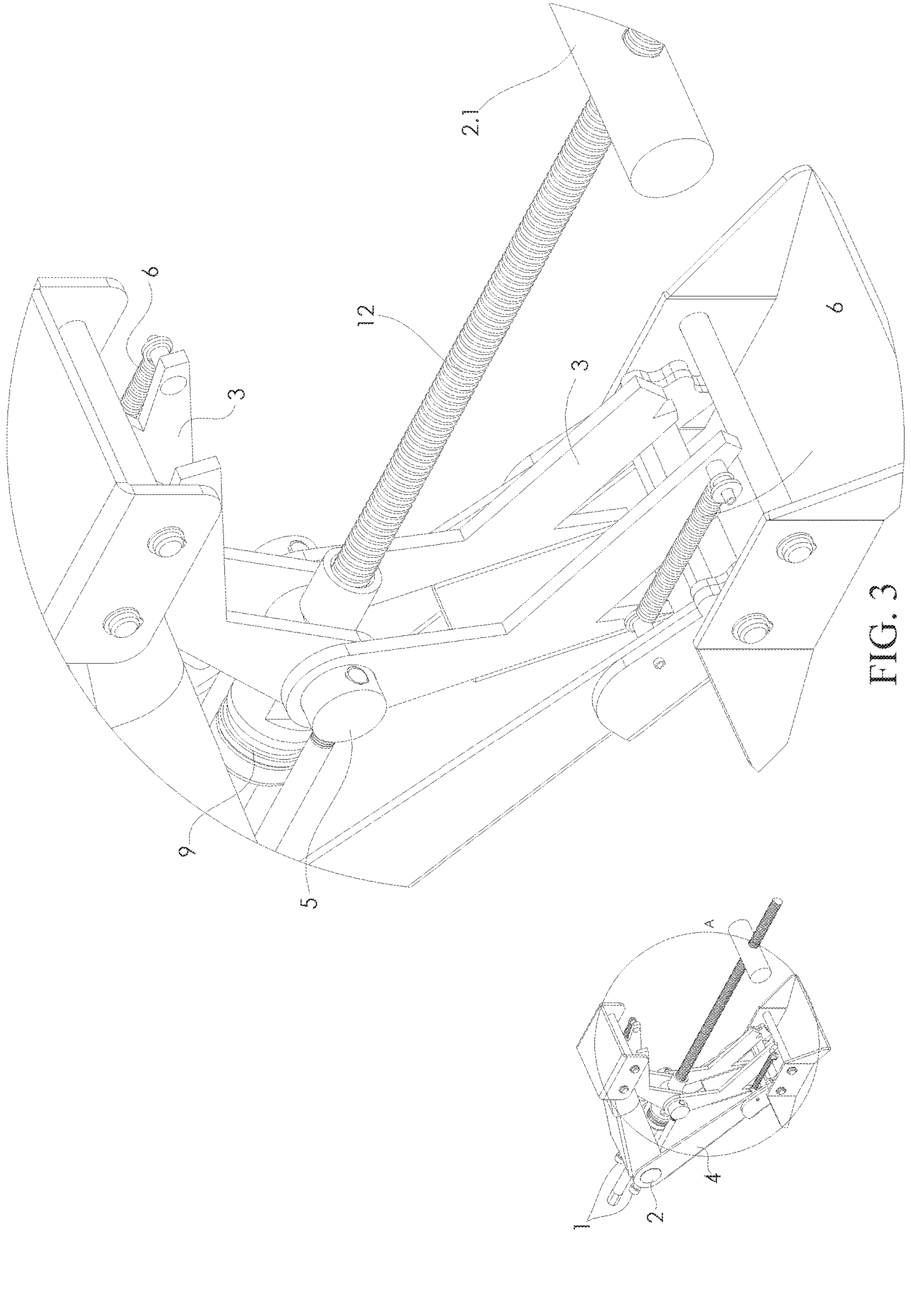
FIG. 3 illustrates an isometric view of an internal layout end assembly of the levers in relation to the scissor jack.

FIG. 3 illustrates the internal layout end assembly of the levers in relation to the jack.

In one embodiment, during lowering position of the scissor jack the springs 6 or any other retaining mechanisms are attached to the pair of levers 3 for the purpose of alignment. Once a first stage of each lever is fully extended, a second stage takes over at a first pivot point 7 at an optimum angle. Angle of operation of the first stage of the lever is in contact with a second pivot point 8, in a manner that the same optimum angle of the scissor jack is simulated by the first stage of the lever at approximately 75% of the range of the scissor jack.

In a typical embodiment, other mechanisms in place of the threaded rod 12 could be utilised, but not limited to, hydraulic or pneumatic cylinders.

In yet another typical embodiment, during operational state of the scissor jack, the action of the threaded shaft 12 against the thrust bearing 9 in contact with the inner third trunnion 5, pulls the inner third trunnion 5 towards the threaded outer trunnion 2.1 first, in order to force inner levers (the pair of levers) to open and then afterwards force the bolts of the inner third trunnion 5 to act against the outer trunnion 2, thereby causing the scissor jack to rise.

In general, the embodiments described herein relate generally to jacking systems that can be used in a variety of sizes to lift various loads. A typical embodiment is used for light motor vehicles. It is understood that the embodiments can be modified in several ways for different uses and implementations.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the images and described in the specification are intended to be encompassed by the present invention.

What is claimed is:

1. A scissor jack, comprising:

four arms hingedly arranged to provide two opposite elbows between a base and a load support;

a pair of trunnions with a first outer trunnion at a first outer elbow and a second threaded trunnion at a second outer elbow opposite to the first outer elbow connected through a threaded shaft;

an inner third trunnion passing through the threaded shaft, wherein the inner third trunnion is configured to allow free rotational motion of an unthreaded section of the threaded shaft, wherein the inner third trunnion is connected to two rods to form a yoke, the yoke is configured to slideably pass through the first outer trunnion of the first outer elbow to extend beyond the first outer elbow, wherein the scissor jack comprises springs or any other retaining mechanism attached to a pair of levers, and wherein the pair of levers are configured to return to their original position, during lowering of the scissor jack.

2. The scissor jack of claim 1, further comprising a thrust bearing configured to be located in a fixed position on the unthreaded section of the threaded shaft and is in contact with the inner third trunnion to form a portion of the yoke.

3. The scissor jack of claim 1, wherein the pair of levers are configured to be pivotally secured on the inner third trunnion.

4. The scissor jack of claim 1, wherein each of the two rods comprises a nut configured to prevent the respective rods from getting withdrawn from the first outer trunnion of the first outer elbow.

* * * * *